Feb. 3, 1931. G. J. WILLER 1,790,688
BRICK FORK
Filed Jan. 24, 1929 2 Sheets-Sheet 1
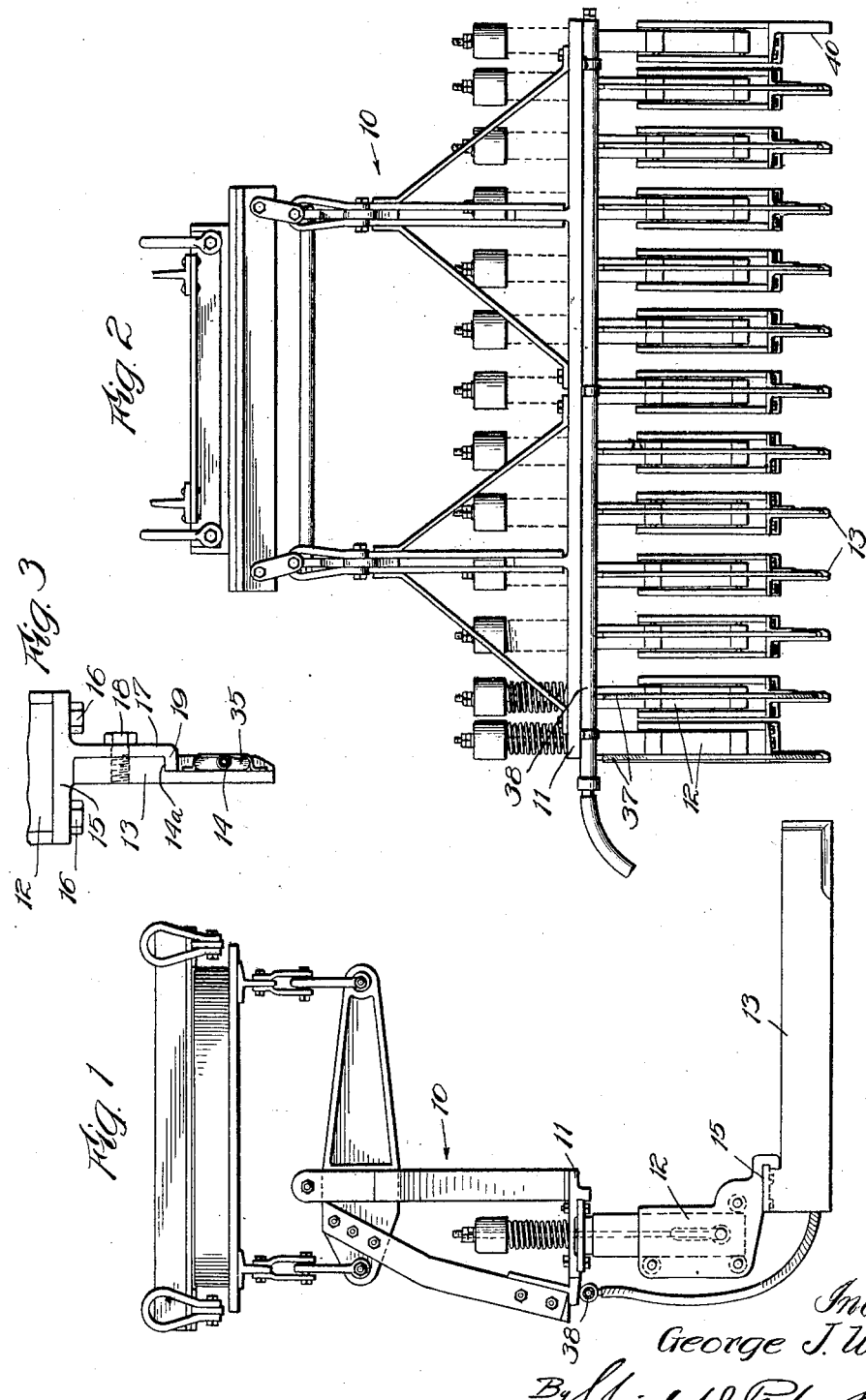
Inventor
George J. Willer Feb. 3, 1931.  G. J. WILLER  1,790,688
BRICK FORK
Filed Jan. 24, 1929  2 Sheets-Sheet 2
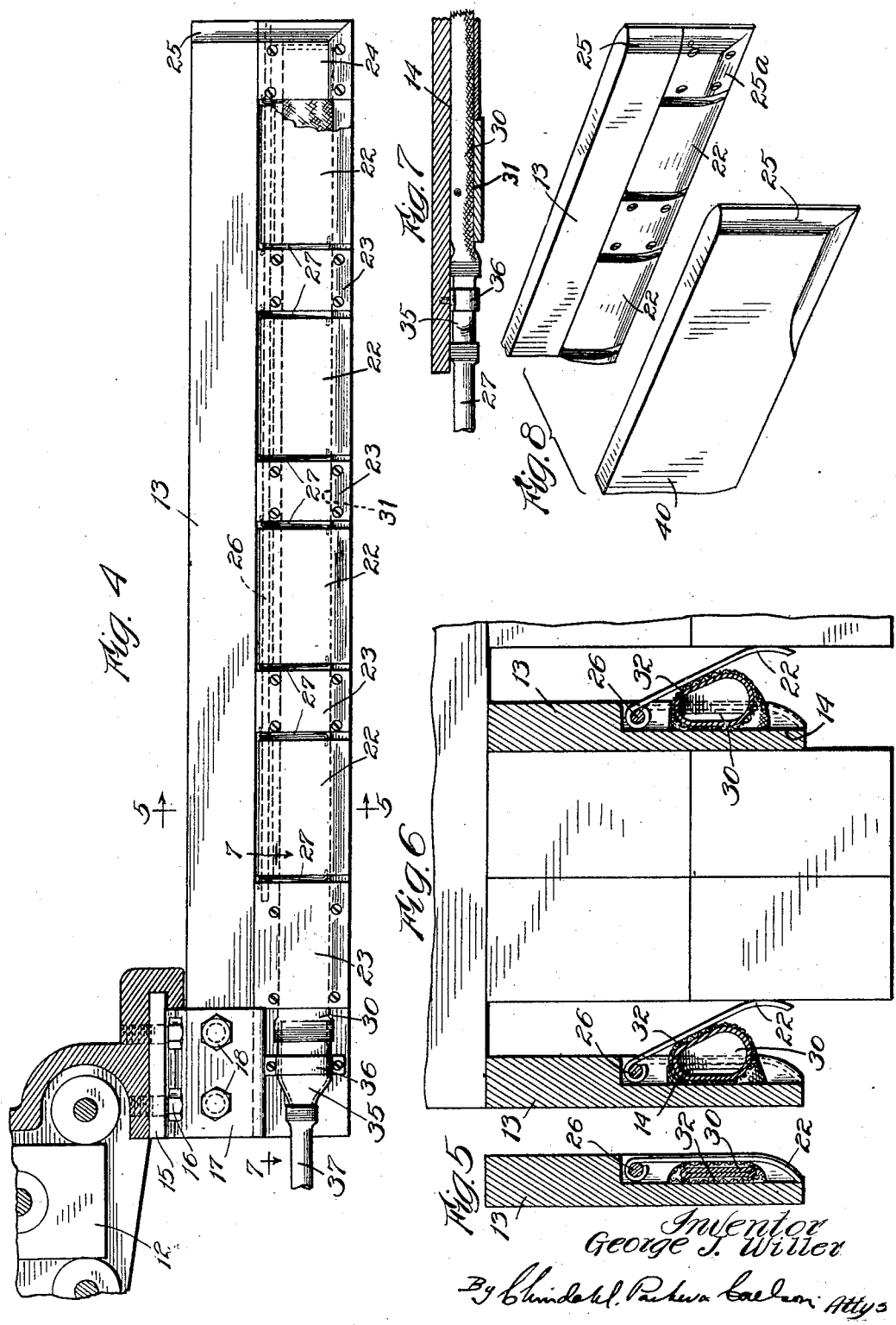

Patented Feb. 3, 1931

1,790,688

UNITED STATES PATENT OFFICE

GEORGE J. WILLER, OF BLUE ISLAND, ILLINOIS, ASSIGNOR TO TUTHILL BUILDING MATERIAL COMPANY, OF CHICAGO, ILLINOIS, A CORPORATION OF ILLINOIS

BRICK FORK

Application filed January 24, 1929. Serial No. 334,619.

This invention relates to improvements in brick forks for use in moving bricks in stacks and more particularly to the mechanism for clamping the bricks.

Brick forks usually comprise a plurality of parallel spaced tines suspended horizontally from a frame. The tines are adapted to be inserted between various rows of bricks in the basic layer of a stack. Each tine is provided with a clamping mechanism adapted to clamp the bricks in the basic layer to constitute the latter a support for the entire stack when the stack is lifted or moved.

The primary object of the present invention is to provide a brick fork having a novel clamping mechanism comprising spaced clamping members on the tines and flexible inflatable means underlying said members and adapted upon inflation to force said members into engagement with the adjacent bricks.

Another object is to provide a brick fork having a novel clamping mechanism which is simple and inexpensive in construction, which has a resilient action adapted to clamp the bricks in the basic layer with equal pressure regardless of irregularities in the shape and arrangement of the bricks, and which is adapted to be easily and quickly released.

Other objects and advantages of the invention will become apparent from the following detailed description taken in connection with the accompanying drawings, in which:

Figure 1 is a side elevation of a brick fork embodying the features of the invention.

Fig. 2 is a rear elevation of the brick fork.

Fig. 3 is an enlarged rear end view of one of the tines.

Fig. 4 is an enlarged side elevation of one of the tines.

Fig. 5 is an enlarged section of one of the tines taken along line 5—5 of Fig. 4, showing the clamping mechanism in inoperative position.

Fig. 6 is an enlarged section of two of the tines, similar to that shown in Fig. 5, but with the clamping mechanism in engagement with bricks.

Fig. 7 is an enlarged detail section of one of the tines taken along line 7—7 of Fig. 4.

Fig. 8 is a fragmentary perspective view of the front ends of the two right end tines as viewed in Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the exemplary embodiment of the invention comprises a frame 10 which may have any suitable form, and which in the present instance comprises a transverse bar 11 yieldingly supporting a plurality of spaced depending supports 12 to which a plurality of parallel spaced tines 13 are secured.

Each tine 13 comprises a flat elongated bar, one end of which is secured to the support 12 and the free end of which is beveled along its vertical edge as indicated at 25 and along its bottom edge as indicated at 25$^a$ to facilitate insertion between the bricks. One side of the tine is smooth to provide a surface against which the bricks are adapted to be clamped and the other side is recessed along its lower portion as indicated at 14, thereby defining a longitudinal shoulder 14$^a$. Suitably mounted in the recess are a plurality of clamping members 22 adapted to urge the bricks against the smooth opposed surface of the adjacent tine.

Each tine 13 may be secured to the support 12 by any suitable means. The particular means employed in the present instance is a T-shaped bracket having a horizontal flange 15 secured to the support 12 by screws 16, and having a stem 17 extending downwardly along the recessed side of the tine 13 and secured thereto by screws 18. The end of the stem 17 has a lateral flange 19 engaging in the recess 14 and against the shoulder 14$^a$.

The clamping members 22, which are mounted in the recess 14, are arranged for pivotal movement outwardly from the tine 13. This is accomplished in the present instance by mounting the clamping members 22 at their upper edges on a pivot rod 26. Between the clamping members 22 to space them apart are stationary plates 23 secured to the tine 13 by means of screws. The stationary plates 23 also serve as supports for the pivot rod 26. Torsion springs 27 adapted to hold the clamping members 22 tightly against the tine 13 are anchored in the stationary plates 23 and secured to the edges of the clamping members 22. The clamping members 22 when in inoperative position and the stationary plates 23 lie entirely within the recess 14, and their outer surfaces are flush with the surface of the tine 13 to permit of easy insertion of the latter between the bricks. The stationary plate 24 on the front end of the tine 13 is beveled similarly to the tine itself.

The means of actuating the clamping members 22 comprises pneumatic means underlying the clamping members 22 and adapted to be inflated by the admission of pressure fluid. In the present instance, this means comprises an inflatable tube 30 adapted on inflation to urge the clamping members 22 outwardly, and on deflation to permit the springs 24 to return the members to inoperative position. This tube 30 is placed in the recess 14 under both the clamping members 22 and the stationary plates 23, the plates being recessed at 31 in the inner surfaces to embrace the tube, and serving to hold the tube in position. The outer end of the tube 30 may be sealed in any suitable manner to prevent leakage therefrom, and in the present instance, this is accomplished by folding the free end of the tube 30 back under itself and securing the fold tightly to the tine by means of the plate 24 on the end of the tine. The tube 30 is preferably made of rubber which is impervious to the pressure fluid and has an outer covering 32 of fabric or the like for reinforcement.

The inner end of tube 30 is fitted over and tightly bound to one end of a nipple 35. The nipple 35 is flattened and of a thickness less than the depth of the recess 14 of the tine 13 so as not to protrude therefrom. It is rigidly held to the tine by means of a strap 36. The other end of the nipple 35 is tapered down and over it is fitted a connecting hose 37. The hose 37 is connected to a manifold 38 which has one outlet for each tine and which is connected to a suitable source of pressure fluid (not shown).

In the particular embodiment shown the clamping plates 22 are on the right hand side of the tines 13 as viewed in Fig. 2. It is unnecessary to have any clamping plates on the tine 40 at the extreme right end of the machine as shown in Fig. 2, and this tine 40 is, therefore, made plain as shown in Fig. 8.

The operation of the fork may be briefly described as follows. The bricks in the basic layer of the stack are arranged in rows with spaces between the rows (Fig 6). Assuming the tube 30 to be deflated, the torsion springs 27 cause the clamping plates 22 to lie flush with the stationary plates 23 and the tine 13. The tines 13 are then inserted into the spaces between the rows in the basic layer, the beveled end 25 assisting in preventing obstruction. Pressure fluid is then admitted to the tubes 30 causing inflation of the tubes under the clamping plates 22 and the latter will be urged outwardly into clamping engagement with the bricks causing them to be clamped against the smooth side of the adjacent tine.

While the bricks in the basic layer are thus clamped the stack may be moved about and deposited elsewhere.

To withdraw the fork from the stack, the pressure fluid in the tubes 30 is released, thereby deflating the tubes and permitting the torsion springs to return the clamping plates 22 to inoperative position. The tines 13 then may be withdrawn from the spaces between the rows.

From the foregoing it will be evident that I have provided a novel means for clamping the bricks which is simple and inexpensive to construct, and which is resilient in action to compensate for irregularities in the shape and arrangement of the bricks.

I claim as my invention:—

1. In a brick fork, in combination, a plurality of parallel spaced tines, spaced brick clamping means on said tines, and inflatable means underlying said clamping means and adapted when inflated to move said clamping means outwardly.

2. In a brick fork, in combination, a plurality of parallel spaced tines, spaced clamping plates pivotally mounted on said tines, and an inflatable tube underlying said clamping plates and adapted when inflated to pivot said clamping plates outwardly.

3. In a brick fork, in combination, a plurality of parallel spaced tines having spaced recesses on one side thereof, clamping plates pivotally mounted in said recesses, said plates when in inactive position lying flush with the adjacent outer surfaces of their respective tines, and an inflatable tube underlying said plates and adapted when inflated to pivot said plates outwardly into active position.

4. In a brick fork, in combination, a plurality of parallel spaced tines, each having a longitudinal groove cut in one side thereof, alternate stationary and clamping plates mounted in said groove, said clamping plates being movably connected to said tines, and inflatable tubes positioned in said grooves under said stationary and clamping plates and adapted when inflated to pivot said clamping plates outwardly.

5. In a brick fork, in combination, a plurality of parallel spaced tines, each having a longitudinal groove cut in one side thereof, a plurality of inflatable tubes one placed in each groove, spaced stationary plates covering said tubes and clamping plates pivotally mounted in said grooves between said stationary plates and over said tubes, said clamping plates when in inactive position and said stationary plates conforming to the contours of said tines, and said tube when inflated being adapted to pivot said clamping plates outwardly into active position.

6. In a brick fork, in combination, a plurality of parallel spaced tines, spaced clamping means on said tines, inflatable means underlying said clamping means and adapted when inflated to move said clamping means outwardly, and means adapted to hold said clamping means against said tines when said tube is deflated.

7. In a brick fork, in combination, a plurality of parallel spaced tines, spaced clamping plates pivotally mounted on said tines, torsion springs adapted to hold said plates against said tines, and an inflatable tube underlying said clamping plates and adapted when inflated to pivot said clamping plates outwardly against the pressure of the springs.

8. In a brick fork, in combination, a frame, a plurality of parallel spaced tines, each of said tines having one end mounted on said frame and the other end beveled, spaced clamping plates pivotally mounted on one side of each of said tines, an inflatable tube for each tine underlying said plates and adapted when inflated to pivot said clamping plates outwardly, and means for supplying pressure fluid to said tube.

9. In a brick fork, in combination, a frame, a plurality of parallel spaced tines the inner ends of said tines being attached to said frame and the free outer ends being beveled, spaced clamping plates pivotally mounted on one side of each of said tines, inflatable tubes underlying said plates and adapted when inflated to pivot said clamping plates outwardly, said tubes being sealed at the outer end of said tines and fluid-pressure means mounted on said frame and attached to said tubes at the inner ends of said tines.

10. In a brick fork, in combination, a frame, a plurality of parallel spaced tines mounted on said frame, one side of each tine presenting a smooth clamping surface, a plurality of clamping plates pivotally mounted on the other side of each tine and adapted to clamp brick against said surface, and inflatable tubes underlying said plates and adapted when inflated to move said plates into clamping engagement with the brick.

11. In a brick fork, in combination, an elongated tine, a plurality of aligned clamping plates adjustably mounted on one side of said tine in longitudinally spaced relation, and a single pneumatic means for actuating said plates.

12. In a brick fork, in combination, an elongated tine, a plurality of aligned clamping plates adjustably mounted on one side of said tine in longitudinally spaced relation, and a single inflatable means underlying said plates and adapted upon inflation to urge said plates outwardly.

13. In a brick fork, in combination, an elongated tine, a plurality of aligned clamping plates adjustably mounted on one side of said tine in longitudinally spaced relation, spring means tending to maintain said plates in inoperative position, and a single inflatable means underlying said plates and adapted upon inflation to urge said plates outwardly against the force of said spring means.

14. In a brick fork, in combination, a flat elongated tine smooth on one side and having a plurality of longitudinally spaced recesses on the other side, a plurality of clamping members movably secured in said recesses, each of said clamping members having an inoperative position in which they lie fully within said recesses and are flush with the adjacent outer surface of said tine, and having an operative position in which they project outwardly from said tine, a longitudinal passage extending through said tine and intersecting said recesses, and a laterally expansible and contractible pneumatic member secured in said passage for moving said clamping members into operative position.

15. In a brick fork, in combination, an elongated tine, spaced stationary members forming continuations of the adjacent outer surface of said tine and defining recesses therebetween, said stationary members being recessed on their inner faces to define a plurality of openings aligned longitudinally of said tine, a plurality of clamping members movably secured in said recesses, and a tube extending through said openings and across said recesses.

In testimony whereof, I have hereunto affixed my signature.

GEORGE J. WILLER.